Nov. 25, 1941.  C. J. WAGNER  2,264,228

GUARD OR RUB RAIL

Filed Nov. 4, 1940

INVENTOR.
CARL J. WAGNER
BY
ATTORNEYS

Patented Nov. 25, 1941

2,264,228

UNITED STATES PATENT OFFICE 2,264,228

GUARD OR RUB RAIL

Carl J. Wagner, Detroit, Mich.

Application November 4, 1940, Serial No. 364,282

11 Claims. (Cl. 293—57)

This invention relates generally to guard or rub rails and refers more particularly to those designed for use upon vehicle bodies, especially upon the upright sides of trailers, buses and the like.

Heretofore rails of this type have been held in place by fasteners such as screws, bolts and the like that extended transversely through the center of the rails from the outermost or contact surface thereof into the sides of the vehicle body. Thus, the fastening elements had to be very long and to be effective had to be substantial in size. Frequently, the heads of such fastening elements protruded outwardly beyond the contact surface mentioned and not only were unsightly but formed objectionable interruptions to or obstructions upon the usually smooth contact surface of the rail.

In the present instance the rail is so formed that the fastening elements may be much shorter with the heads thereof closer to the vehicle body and may be beneath and protected by the contact surface of the rail. Actually the upper part of the rail provided with the contact surface is relatively wide and overhangs the attaching portion of the rail, hence the fastening elements are not only out of contact but also hidden by the overhanging portion and practically out of sight when the rail is mounted upon a side wall of a vehicle body.

To expedite manufacturing operations and to reduce manufacturing costs, the rail is of such shape that it may expeditiously be formed continuously in a suitable rolling machine and then cut to desired lengths. To close the open ends of such lengths I have provided separately formed end pieces that preferably telescope into and form endwise extensions of the cut lengths. In fact, the assembly of cut lengths and end pieces possesses ornamental characteristics and therefore enhances the appearance of the vehicle body to which it is applied.

Figure 1:
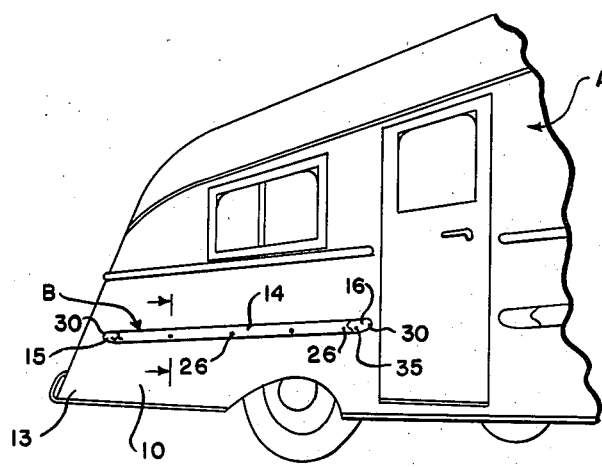
Figure 1 is a fragmentary perspective view of a trailer and showing a guard rail embodying my invention applied thereto.
Figure 2:
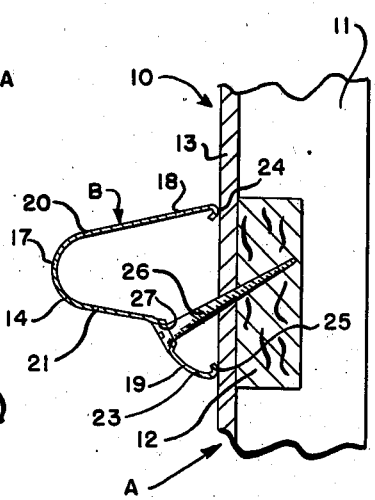
Figure 2 is a fragmentary vertical sectional view taken substantially on the line 2—2 of Figure 1.
Figure 3:
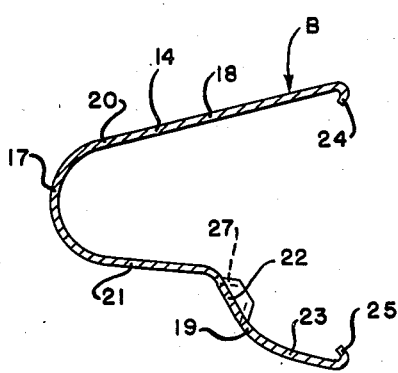
Figure 3 is a cross sectional view through the body of the guard rail.
Figure 4:
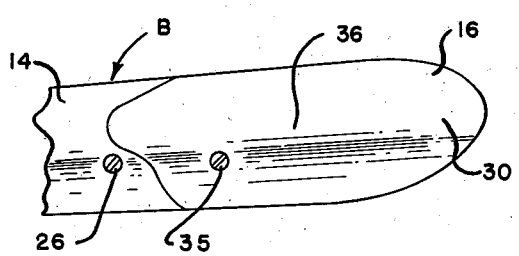
Figure 4 is an enlarged view of a portion of the body and one of the end pieces in assembled relation.
Figure 5:
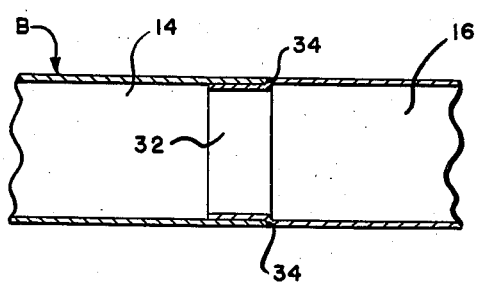
Figure 5 is a fragmentary longitudinal sectional view through the structure shown in Figure 4.

Referring now to the drawing, A is the body of a trailer, and B is a guard or rub rail embodying my invention applied thereto.

As shown, the upright side 10 of the trailer body includes a wooden upright member 11, a wooden horizontal member 12, and an outer sheathing 13 of metal, or any other suitable material.

The rail B is formed of sheet metal and has three sections 14, 15 and 16, respectively. Preferably the intermediate section 14 constitutes the body portion of the rail and is a predetermined length of rolled or otherwise formed sheet metal. Such section 14 has a channel-shaped outer portion 17 and vertically spaced inner flange portions 18 and 19, respectively. The channel-shaped outer portion 17 opens inwardly toward the side wall 10 of the trailer and serves as the guard or rub rail proper of the device, while the flanges 18 and 19 constitute supporting extensions of opposite sides 20 and 21, respectively, of the channel-shaped outer portion 17 and bear against the side wall 10 of the trailer. Preferably the upper flange 18 is in alignment with and constitutes an edgewise extension of the upper side 20 of the channel-shaped portion, while the lower flange 19 has an inclined portion 22 that extends downward and inward from the lower side 21 of the channel portion 17, and a lateral portion 23 that extends substantially horizontally inward from the inclined portion 22. Actually the lower flange 19 cooperates with the lower side 21 of the channel portion to provide a stepped structure. The metal of the flanges 18 and 19 at their inner free edges is returnbent as at 24 and 25, respectively, to provide rounded edges for engagement with the side wall 10 of the trailer.

In the present instance the attaching means for the guard rail comprises screws 26 that extend through suitable holes 27 in the inclined portion 22 of the lower flange 19 and in the metal sheathing 13 and engage the wooden horizontal member 12 of the side wall 10 of the trailer. Due to the inclination of the portion 22 of the flange 19, the screws 26 incline upwardly and inwardly so that the engagement with the horizontal member 12 is substantially in horizontal alignment with the center of the channel-shaped portion 17 of the rail. Actually when one of the screws 26 is adjusted into the horizontal member 12, the rounded edge 25 of the rail fulcrums upon the sheathing 13 so that the rounded edge 24 of the upper flange 18 will be drawn firmly inward and held against the sheathing.

As the intermediate section 14 of the rail is preferably made in a rolling machine, it would be impractical to provide such section with integral formed ends, hence the end pieces 15 and 16 are formed separately and assembled with the section 14 when the latter is applied as aforesaid to the trailer body. Preferably each end piece is shaped to form an endwise extension of the section 14 and has tapered closed ends 30. To facilitate assembly with the section 14 such end pieces 15 and 16 have reduced portions 32 that telescope within the open ends of the section 14 so that the shoulders 34 provided by the reduced portions 32 will abut the ends of the section 14. One or more screws 35 may be used in the inclined portions 36 of the end pieces to hold the said end pieces in place on the side wall 10 of the trailer and to hold the end pieces against withdrawal from the section 14 of the rail.

Thus, from the foregoing it will be apparent that the channel-shaped portion 17 and upper flange 18 cooperate with each other to provide a relatively wide contact portion while the flange 19 is beneath and constitutes a relatively narrow attaching portion. As a result, the screws 26 may be relatively short and are protected by the overhanging contact portion mentioned. The end pieces 15 and 16 close the open ends of the section 14 and cooperate therewith to provide a neat appearance.

What I claim as my invention is:

1. A guard or rub rail having three sections, one being an elongated member provided throughout its length with a wide contact portion and provided beneath the contact portion with an attaching portion, and the other two sections constituting endwise extensions of and closing opposite ends of the elongated member.

2. A guard or rub rail having three sections, one being an elongated member provided throughout its length with a wide contact portion and provided beneath the contact portion with an attaching portion, and the other two sections being separate end pieces telescopically engaging and closing opposite ends of the elongated member.

3. A guard or rub rail for vehicle bodies comprising an elongated member provided throughout its length with a horizontally opening channel-shaped portion and provided on the underside of the channel-shaped portion with a relatively narrow attaching portion having holes therein for headed fastening elements, the top wall of the channel portion being provided throughout its length with a rearwardly projecting flange-like extension, said channel-shaped portion and flange-like extension being imperforate, free of fastening elements and cooperating with each other to provide a relatively wide contacting portion, the attaching portion being at the rear of the contacting portion beneath the flange-like extension and being relatively narrow so that headed fastening elements extending through the holes therein for engagement with a vehicle body may be relatively short and have the heads thereof in rear of the forward imperforate part of the wide contacting portion close to the vehicle body beneath and protected by said wide contacting portion.

4. A guard or rub rail for vehicle bodies comprising an elongated member provided throughout its length with a horizontally opening channel-shaped portion and provided on the underside of the channel-shaped portion with a relatively narrow attaching portion having holes therein for headed fastening elements, the top wall of the channel portion being provided throughout its length with a rearwardly projecting flange-like extension, said channel-shaped portion and flange-like extension being imperforate, free of fastening elements and cooperating with each other to provide a relatively wide contacting portion, the attaching portion being at the rear of the contacting portion beneath the flange-like extension and being relatively narrow so that headed fastening elements extending through the holes therein for engagement with a vehicle body may be relatively short and have the heads thereof in rear of the forward imperforate part of the wide contacting portion close to the vehicle body beneath and protected by said wide contacting portion, said attaching portion inclining downwardly and rearwardly so that the fastening elements extending through the holes therein may incline upwardly and rearwardly for engagement with the vehicle body at points substantially in horizontal alignment with the center of the channel-shaped portion.

5. A guard or rub rail for vehicle bodies comprising an elongated member provided throughout its length with a horizontally opening channel-shaped portion and provided on the underside of the channel-shaped portion with a relatively narrow attaching portion having holes therein for headed fastening elements, the top wall of the channel portion being provided throughout its length with a rearwardly projecting flange-like extension, said channel-shaped portion and flange-like extension being imperforate, free of fastening elements and cooperating with each other to provide a relatively wide contacting portion, the attaching portion being at the rear of the contacting portion beneath the flange-like extension and inclining downwardly and rearwardly so that the fastening elements extending through the holes therein may incline upwardly and rearwardly for engagement with the vehicle body at points substantially in horizontal alignment with the center of the channel-shaped portion.

6. A guard or rub rail for vehicle bodies comprising an elongated member provided throughout its length with a horizontally opening channel-shaped portion and provided on the underside of the channel-shaped portion with a relatively narrow attaching portion having holes therein for headed fastening elements, the top wall of the channel portion being provided throughout its length with a rearwardly projecting flange-like extension, said channel-shaped portion and flange-like extension being imperforate, free of fastening elements and cooperating with each other to provide a relatively wide contacting portion, the attaching portion being at the rear of the contacting portion beneath the flange-like extension and inclining downwardly and rearwardly so that the fastening elements extending through the holes therein may incline upwardly and rearwardly for engagement with the vehicle body at points substantially in horizontal alignment with the center of the channel-shaped portion, the construction and arrangement of the inclined attaching portion and the flange-like extension being such that the lower rear edge of said inclined attaching portion is adapted to fulcrum on the vehicle body when the fastening elements are engaged as aforesaid with said vehicle body so that the rear free edge of said flange-like extension will be forced firmly toward and held against said vehicle body.

7. A guard or rub rail for vehicle bodies comprising an elongated member provided throughout its length with a relatively wide contacting portion and provided on the underside of said wide contacting portion with a depending attaching portion having holes therein for headed fastening elements, the wide contacting portion being imperforate and free of fastening elements, the attaching portion being at the rear of the wide contacting portion and being relatively narrow so that the fastening elements in said holes may be relatively short with the heads thereof in rear of the forward edge of the wide contacting portion close to the vehicle body beneath and protected by said wide contacting portion.

8. A guard or rub rail for vehicle bodies comprising an elongated member provided throughout its length at the top thereof with a relatively wide contacting portion and provided at the bottom thereof with a depending attaching portion having holes therein for headed fastening elements, said holes inclining upwardly and rearwardly so that the fastening elements therein may engage the vehicle body at points substantially in horizontal alignment with said wide contacting portion, said attaching portion being at the rear of the wide contacting portion and being relatively narrow so that the fastening elements in said holes may be relatively short with the heads thereof in rear of the forward edge of the wide contacting portion close to the vehicle body beneath and protected by said wide contacting portion.

9. A guard or rub rail for vehicle bodies comprising an elongated member provided throughout its length with a relatively wide contacting portion and provided on the underside of said wide contacting portion with a depending attaching portion having holes therein for headed fastening elements, said holes inclining upwardly and rearwardly so that the fastening elements therein may engage the vehicle body at points substantially in horizontal alignment with said wide contacting portion, said attaching portion being at the rear of the wide contacting portion and being relatively narrow so that the fastening elements in said holes may be relatively short with the heads thereof in rear of the forward edge of the wide contacting portion close to the vehicle body beneath and protected by said wide contacting portion.

10. A guard or rub rail for vehicle bodies comprising an elongated member provided throughout its length with a relatively wide contacting portion and provided on the underside of said wide contacting portion with a relatively narrow depending attaching portion having holes therein for headed fastening elements, the wide contacting portion being imperforate and free of fastening elements, the narrow attaching portion being at the rear of the wide contacting portion so that the fastening elements in said holes may be relatively short with the heads thereof in rear of the forward edge of the wide contacting portion close to the vehicle body beneath and protected by said wide contacting portion, and the holes in said attaching portion inclining upwardly and rearwardly so that the fastening elements in said holes may engage the vehicle body at points substantially in horizontal alignment with said wide contacting portion.

11. A guard or rub rail for vehicle bodies comprising an elongated member provided throughout its length with a relatively wide contacting portion and provided on the underside of said wide contacting portion with a depending attaching portion having holes therein for headed fastening elements, the attaching portion being at the rear of the wide contacting portion and being relatively narrow so that the fastening elements in said holes may be relatively short with the heads thereof in rear of the forward edge of the wide contacting portion close to the vehicle body beneath and protected by said wide contacting portion, said attaching portion inclining downwardly and rearwardly so that the fastening elements extending through the holes therein may incline upwardly and rearwardly for engagement with the vehicle body at points substantially in horizontal alignment with the wide contacting portion.

CARL J. WAGNER.